United States Patent [19]

Meier, Jr. et al.

[11] 4,424,709
[45] Jan. 10, 1984

[54] FREQUENCY DOMAIN ENGINE DEFECT SIGNAL ANALYSIS

[75] Inventors: Raymond C. Meier, Jr., Canton; Stewart V. Gable, Ypsilanti, both of Mich.

[73] Assignee: Ford Motor Company, Dearborn, Mich.

[21] Appl. No.: 409,371

[22] PCT Filed: Jul. 6, 1982

[86] PCT No.: PCT/US82/00901
§ 371 Date: Jul. 6, 1982
§ 102(e) Date: Jul. 6, 1982

[51] Int. Cl.³ ............................................. G01M 15/00
[52] U.S. Cl. ..................................... 73/117.3; 73/115; 364/551
[58] Field of Search ...................... 73/115, 116, 117.3, 73/118, 659, 660; 364/551

[56] References Cited

U.S. PATENT DOCUMENTS

| | | | |
|---|---|---|---|
| 4,064,747 | 12/1977 | Rackliffe et al. | 364/551 X |
| 4,083,234 | 4/1978 | Aono et al. | 73/116 |
| 4,108,362 | 8/1978 | Trussell et al. | 73/116 X |
| 4,128,005 | 12/1978 | Arnston et al. | 73/117.3 |
| 4,398,259 | 8/1983 | Levine | 364/551 |
| 4,401,949 | 8/1983 | Gold | 364/551 X |

*Primary Examiner*—Jerry W. Myracle
*Attorney, Agent, or Firm*—Peter Abolins; Robert D. Sanborn

[57] ABSTRACT

A signal analyzer for detecting engine defects includes sensors (11–17) for detecting engine operating parameters such as engine speed, engine exhaust manifold pressure, engine intake manifold vacuum, blowby gas pressure in the engine crankcase, and oil pressure. Electrical signals representing the frequency and magnitude of the engine operating parameters are used to produce a frequency domain spectrum signal characteristic of the engine being tested. The frequency domain spectrum signal being tested is compared to a frequency domain spectrum signal from a normal engine thereby determining at what frequencies differences between the two signals exist, such differences being indicative of engine defects.

29 Claims, 4 Drawing Figures

FREQUENCY DOMAIN ENGINE DEFECT SIGNAL ANALYSIS

TECHNICAL FIELD

This invention relates to a method and an apparatus for detecting defects in an internal combustion engine using frequency domain signal analysis.

BACKGROUND ART

In known conventional time domain signal analysis techniques, various engine transducers (e.g. exhaust pressure, intake manifold vacuum, oil pressure, crankcase pressure and engine speed) produce periodic electronic signals which define certain engine operating conditions (e.g. intake/exhaust valve opening and closing, cylinder combustion quality, exhaust cylinder blowdown, etc.). The fundamental frequency of these signals is termed the engine's firing frequency and is defined by the following equation:

FIRING FREQUENCY (Hz)=[ENGINE SPEED (RPM)×(N/2)

Where N=number of cylinders

As indicated by the above equation, the fundamental frequency of the signals is a function of engine speed and therefore the electronic signals change frequency as engine speed is increased or decreased. Each engine firing includes two crankshaft revolutions (through 720°) and, for a four cylinder engine, four cylinder firings or, for an eight cylinder engine, eight cylinder firings. In time domain signal analysis, time records as a function of engine crank angle are stored in a computer for the various transducers for an engine containing no defects and operated at a constant speed (e.g. 1000 RPM) in order to establish baseline waveforms. A second time record is taken for a defective engine for comparison to the baseline "normal" waveform. Comparing the two time records, a discriminant is extracted from the data to represent the particular defect as shown in FIG. 1. By determining defects by this method (data as a function of crankangle), defects can also be isolated to a particular cylinder. In this manner, a discriminant can be defined for many engine defects by implanting known defects in normal engines and repeating the above tests. This method can require a considerable amount of data storage and manipulation.

In addition to time domain analysis, frequency domain analysis is also known. For example, U.S. Pat. No. 4,083,234 to Aono et al teaches a method and apparatus for detecting a misfire in an internal combustion engine. A cylinder misfiring is detected by initially sensing the exhaust noises and producing a continuous signal wave having an exhaust noise frequency which is variable with the detected exhaust noises. The waveform has a frequency spectrum having peak values at various frequencies. One such peak exists at the fundamental frequency of the wave and represents a normal operating condition. Other peak values occur at certain fractional harmonics of the fundamental frequency component and represent a misfire of an engine cylinder. The system also incorporates an engine speed signal which, in combination with a frequency spectrum analyzer, aids in the evaluation of the misfired cylinder. In operation, the speed signal is used to control the band pass filtering of the exhaust noise waveform. This patent shows a misfire detection technique using band pass filtering and subsequent frequency spectrum analysis of a noise signal representing exhaust noise. This patent does not teach detection of engine faults other than misfire. Further, there is no teaching of using a plurality of different sensors to identify engine operating conditions. These are some of the problems this invention overcomes.

DISCLOSURE OF THE INVENTION

A signal analyzer for identifying engine defects includes sensor means for indicating engine intake manifold vacuum, exhaust pressure, crankcase pressure, oil pressure and engine speed. Such detected signals for normal engines are compared in the frequency domain with detected signals from engines with implanted defects operated at constant speed without external engine loading. By recognizing specific differences, or looking for the "abnormal" frequency components, engine defects can be identified.

Frequency domain signal analysis can utilize the same engine sensors as known conventional time domain signal analysis techniques. Further, frequency domain signal analysis can provide the same information as the time domain signal analysis, but in a more simplified fashion. Transducer signal output of an engine operating without defects contains distinct frequencies. The largest signal amplitude, and for most sensor outputs the only frequency component, for engines operated at constant speed with no defects, occurs at the engine firing frequency (33.3 Hz for a four cylinder engine operated at 1000 RPM). When a defect occurs in the engine, signal frequencies appear at the sub harmonics and higher order harmonics which are not present in the "normal" spectrum. By looking for these "abnormal" frequencies, certain engine defects can be identified. This approach does not require the storage and manipulation of a large data base and can be implemented in a simplified fashion through the use of analog or digital filter electronic circuits.

BEST MODE FOR CARRYING OUT THE INVENTION

Figure 3:
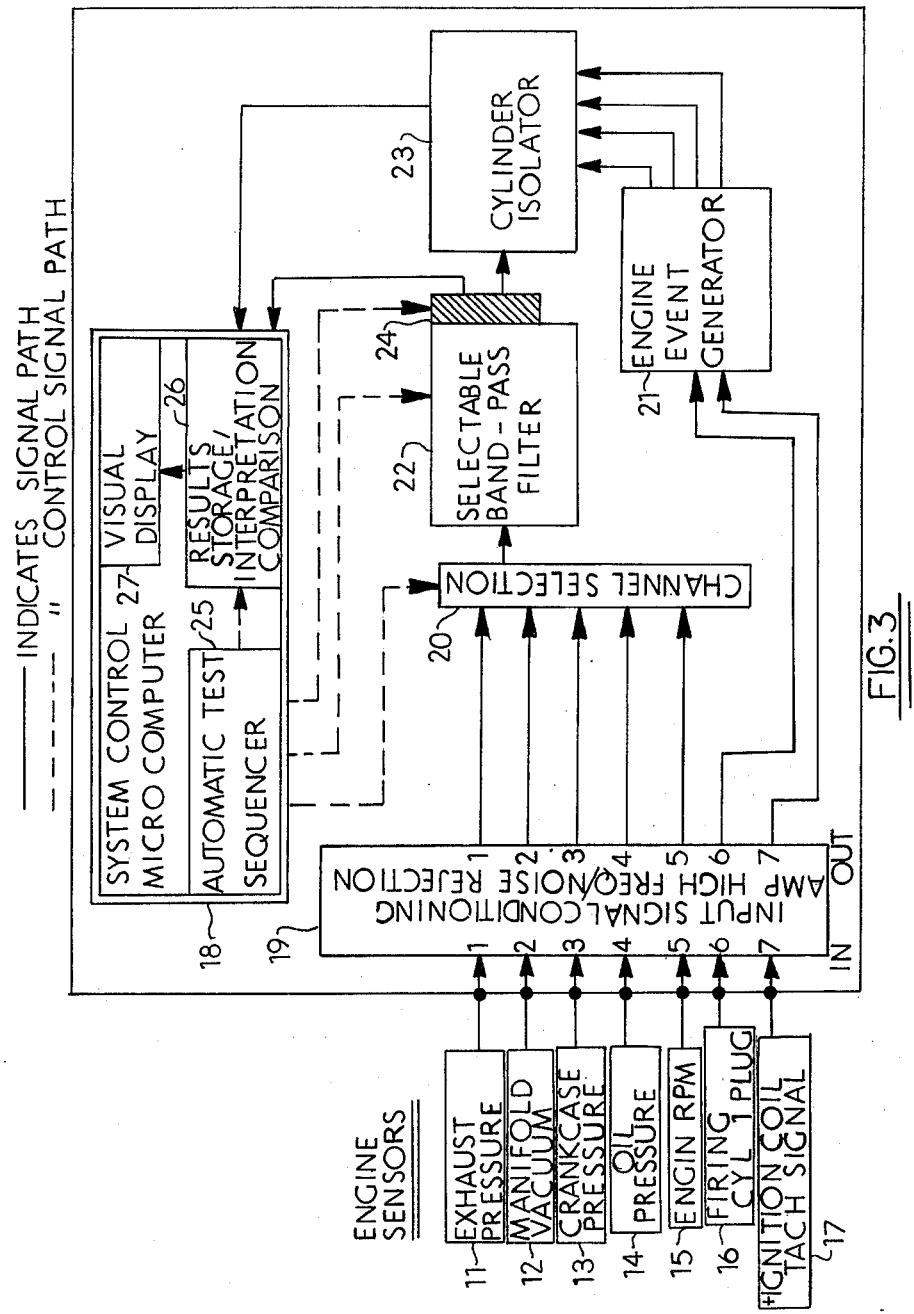
FIG. 3 is a block diagram of an engine defect diagnostic unit in accordance with an embodiment of this invention, including seven sensors of engine operating parameters and processing circuitry.

FIG. 3 shows a block diagram for a proposed design of an unloaded production hot test engine diagnostic unit. Engine sensors 11 through 17 are shown. Sensor 11 measures exhaust pressure, sensor 12 measures intake manifold vacuum, sensor 13 measures crankcase pressure, sensor 14 measures oil pressure, sensor 15 measures engine RPM, sensor 16 provides an electrical pulse when the spark plug of cylinder 1 is fired, and sensor 17 picks up the engine's ignition coil pulses or "tach" signal. Sensors 11 through 17 are applied to an input buffer 19 which amplifies the output from sensors 11 through 17 and selectively passes signals to reject high frequency noise. The output of sensors 11 through 15 is applied to a channel selection switch 20 which provides as an output one of the five inputs. The output of buffer 19 from sensors 16 and 17 is applied to an engine event generator 21 which provides an engine timing event indication thereby providing the capability to determine in which cylinder a particular fault may take place. Engine event generator 21 has four output paths, one path associated with one cylinder of the engine to be tested. Engine event generator 21 applies a square wave to the output path when the associated cylinder fires. The occurrence of a cylinder firing is indicated by an input from sensor 17. The start of a cylinder firing sequence is indicated by an input from sensor 16.

The output of channel selection switch 20 is applied to a selectable bandpass filter 22 for passing a predetermined range of frequencies to a cylinder isolator 23 to provide cylinder defect isolation. Isolator 23 also has four inputs from the four outputs of engine event generator 21. Thus, if the existence of a defect is indicated by the output from selectable bandpass filter 22, the cylinder associated with the defect can be determined by the output from engine event generator 21. Commercially available microprocessor based integrated circuit devices (for example, the Intel 2920 signal processor), or an industrial type frequency spectrum analyzer (i.e. Spectral Dynamics Model SD 210A), could perform the functions of selectable bandpass filter 22.

A microcomputer 18 is coupled to provide actuation of channel selection switch 20, selectable bandpass filter 22 and an output buffer 24 at the output of selectable bandpass filter 22. Microcomputer 18 includes an automatic test sequencer 25 which is coupled to a defect storage and interpretation comparison module 26. The output of module 26 is applied to a visual display 27. The output from selectable bandpass filter 22 and isolator 23 is applied to the storage and interpretation comparison module 26. Microcomputer 18 performs the tasks of automatic test sequencer, interpretation of the test results and interaction with test stand operator. During the automatic test sequence mode, system control microcomputer 18 must select the proper signal channel through channel selection switch 20 and set up selectable bandpass filter 22 and store the frequency components for the diagnostic tests. For example, the system control microcomputer 18 would sequentially select each individual sensor (exhaust pressure, intake manifold vacuum, crankcase pressure, oil pressure, and engine speed) and set up the required parameters for selectable bandpass filter 22 so that it would scan signal frequencies between 0 and 100 Hz. The combination of microcomputer 18 and selectable bandpass filter 22 acts as a frequency domain analyzer circuit to generate a frequency domain spectrum signal from the outputs of sensors 11 through 15.

Frequency components contained in the input signal for each engine sensor in the range of 0 to 100 Hz can be stored in microcomputer 18. This would then constitute a pattern or matrix of frequency components for the particular engine currently being tested. By comparing, in microcomputer 18, the tested results to previously defined and stored patterns for specific engine defects and finding a match, the system controller, through visual display 27, informs the operator of the defective component and indicates in which engine cylinder the defective component is located. Thus microcomputer 18 includes in defect storage and interpretation comparison module 26 a frequency classifier which associates particular defects with particular frequency domain spectrum signals.

Figure 1:
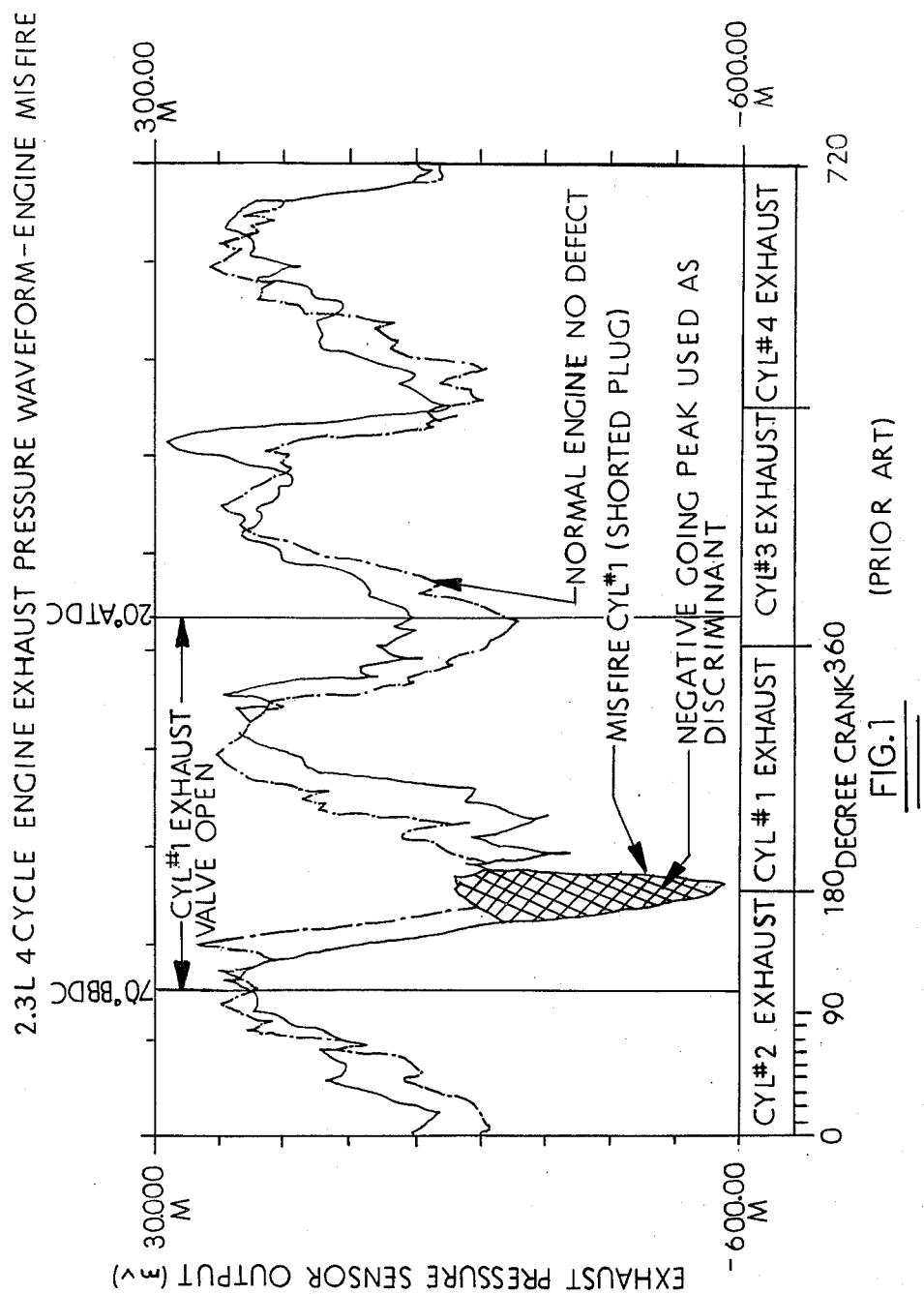
FIG. 1 is a graphical representation of typical results for an exhaust pressure prior art time domain measurement comparing data for a normal engine with no defect to an engine operated with cylinder 1 spark plug wire shorted to ground.
Figure 2:
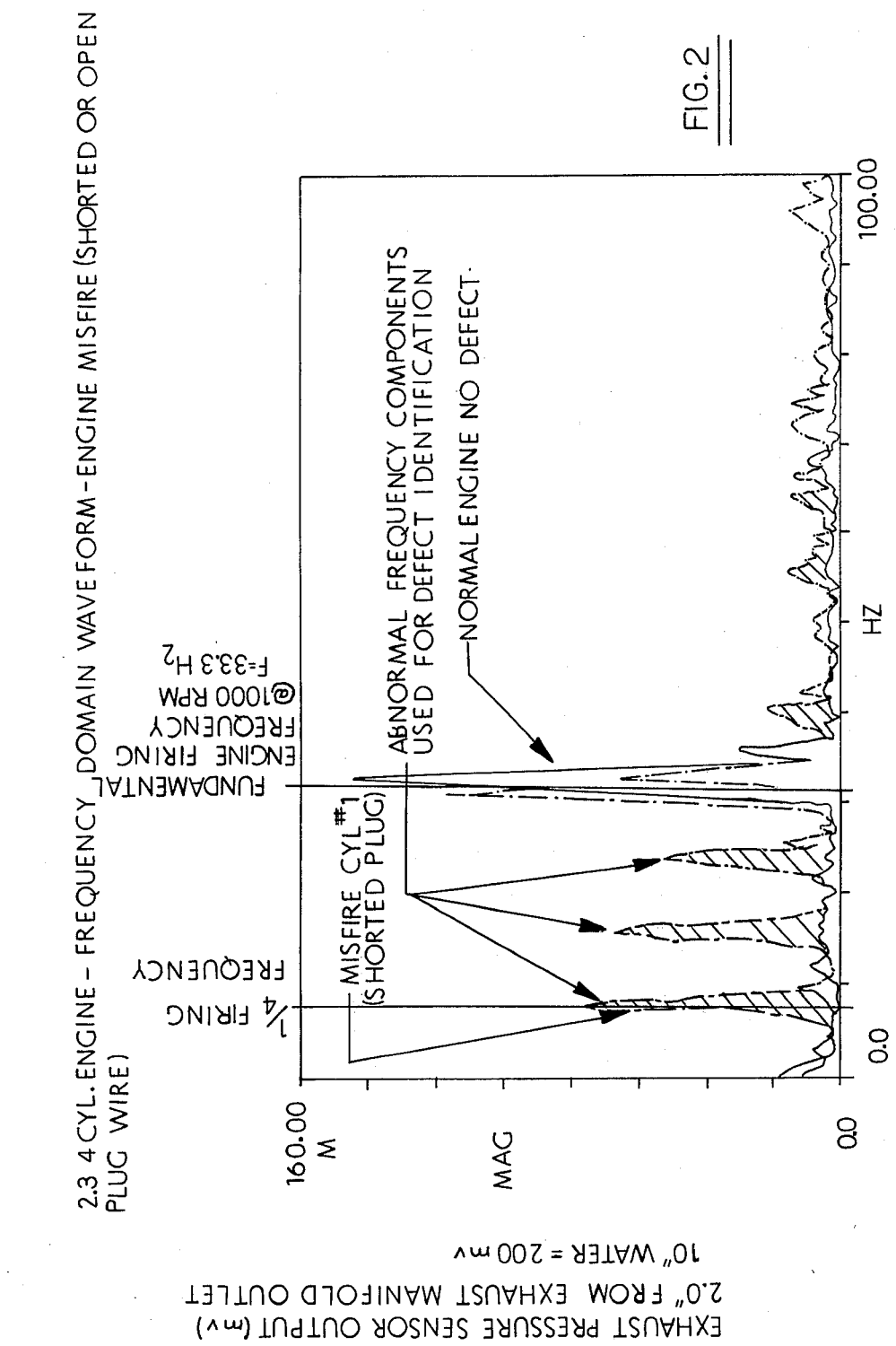
FIG. 2 is a graphical representation of typical results for an exhaust pressure frequency domain measurement comparing data for a normal engine with no defect to an engine operated with cylinder 1 spark plug wire shorted to ground, in accordance with an embodiment of this invention.

Referring to FIG. 2, the frequency spectrums for a "normal" and an "abnormal" engine are shown. When a defect occurs in the engine, signal frequencies appear at the sub harmonics and higher order harmonics which are not present in the "normal" spectrum. For example, engine defect identification capability for frequency domain signal analysis has been demonstrated with a Ford 2.3 liter 4-cylinder engine operated at 1000 RPM with no external loading for various engine defects, such as: shorted plug wires, lean engine air/fuel ratio, intake manifold vacuum leaks, collapsed intake and exhaust valve tappets, EGR system leaks, improper camshaft timing, missing main and connecting rod bearings, missing piston rings, scored valves, weak valve springs, and excessive engine blowby.

Cylinder defect isolation capability is important because in some cases the engine may have more than one of the same component. For example, it would not be sufficient to inform the test stand operator that the engine had a defective secondary ignition wire since a typical engine has one ignition wire for each cylinder. Engine event generator 21 and isolator 23 can be used for defect isolation. The one quarter firing frequency component (see FIG. 2 or the following appendix) contained in each defect spectrum corresponds to the combustion event for a single cylinder of a multicylinder engine. When this component is bandpass filtered (center frequency of the filter set at one quarter firing frequency) from the defect spectrum and compared (using isolator 23) to the firing events of the engine (e.g. firing of each cylinder) the defective component can be isolated to a particular cylinder of the engine. The tachometer signal from the positive side of the ignition coil and a signal provided by a common clamp-on inductive pick-up (e.g. Sun Electric Corp. Model 507-6) on cylinder 1 spark plug wire coupled to engine event generator 21 electronic circuit would provide the engine firing events.

Defect patterns or difference frequency spectrums have been defined experimentally for over 50 Ford 2.3 liter 4-cylinder engine defects as shown in the following appendix. For most engine defects it would not be necessary to store all of the frequency components as shown in the appendix. For example, a small fraction of the total data could be used to provide a "unique set" of sensors and their respective frequency components that could be used to identify most engine defects.

Figure 4:
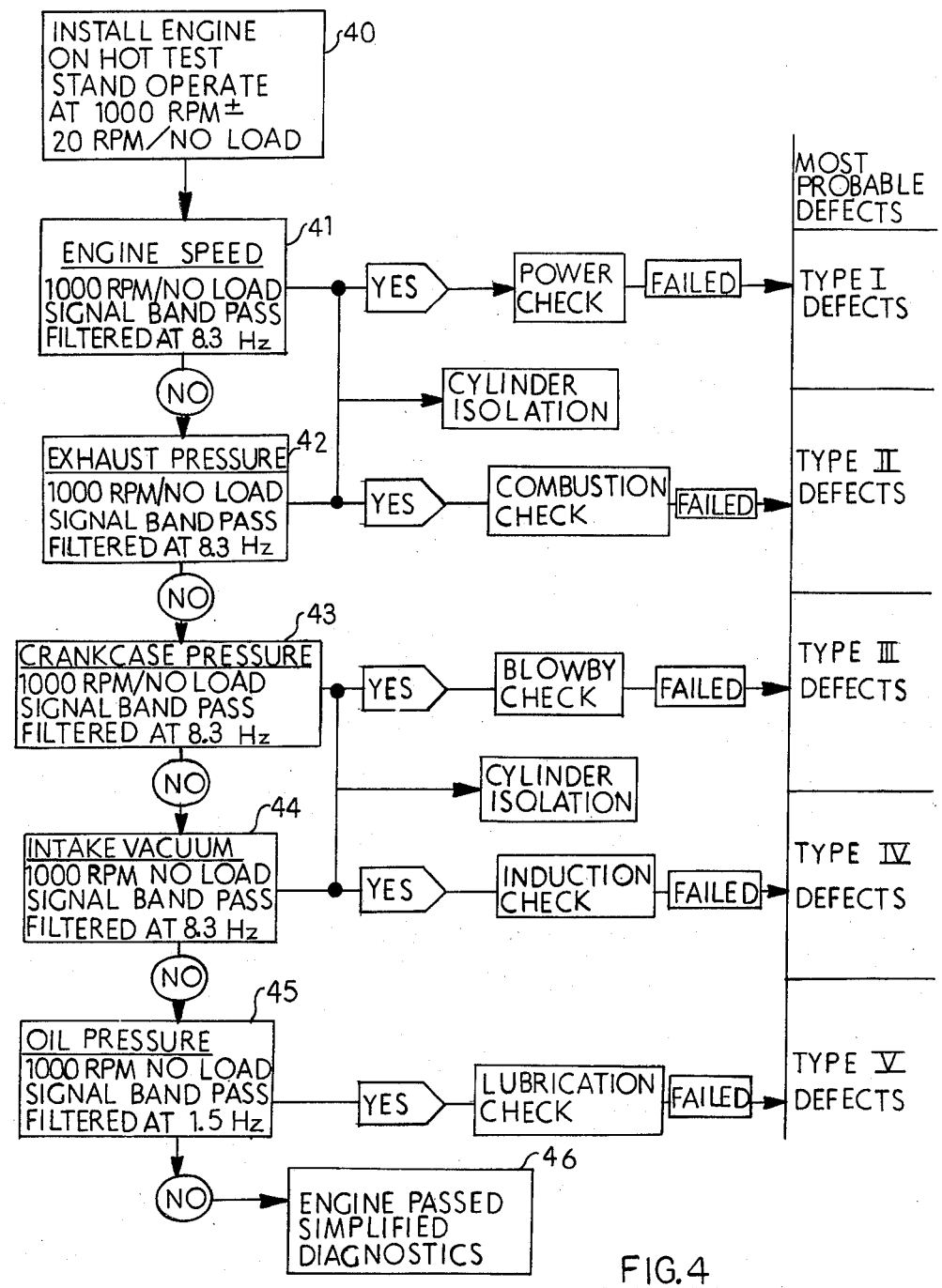
FIG. 4 is a production hot test scheme for the application of frequency domain signal analysis techniques for a simplified pass/fail test using bandpass filtering in accordance with an embodiment of this invention.

Referring to FIG. 4, a simpler and lower cost approach than FIG. 3 is based on the fact that almost all defects can be detected by determining the presence of the one quarter firing frequency component (8.3 Hz at 1000 RPM for a four cylinder engine) of the engine sensors shown in FIG. 3. The steps in the illustrated method include at block 40 installing the engine on a hot test stand and operating it at 1000 RPM plus or minus 20 RPM at no load. Next, at block 41, the engine speed signal is bandpass filtered at 8.3 Hz. There would be an output at this frequency if one cylinder were behaving differently from the remaining three cylinders. Similarly, blocks 42, 43 and 44 filter a band of signals at 8.3 Hz from the exhaust pressure, crankcase pressure and intake vacuum sensors. In each case, if an output is detected at blocks 41 through 44, then there is the possibility of a defect. For example, Type I defects associated with block 41 include collapsed exhaust valve tappet, collapsed intake valve tappet, exhaust gas recirculation leaks, piston ring missing, scored intake valve, weak valve springs, and head gasket leaks. Type II defects associated with block 42 include fuel system defects, intake leaks, secondary ignition system defects, collapsed intake and exhaust valve tappets, exhaust gas recirculation leaks, retarded spark timing, scored intake and exhaust valves, weak valve springs and head gasket leaks. Type III defects associated with block 43 includes holes in piston dome greater than about 1/32 of an inch in diameter, two top compression piston rings missing and head gasket leaks. Type IV defects associated with block 44 include collapsed intake and exhaust valve tappets, exhaust gas recirculation leaks, weak valve springs, and head gasket leaks. Type V defects associated with block 45 include main bearing missing. If there were no outputs from blocks 41 through 45, then the sequence progresses to block 46 wherein the engine is considered to have passed simplified diagnostics.

In the case of engine oil pressure, a frequency component at one quarter the engine's firing frequency occurs in the normal spectrum of a Ford 2.3 liter 4-cylinder engine. A lower sub harmonic was chosen as the center frequency of the bandpass filter (1.5 Hz) to provide defect detection. A pass/fail type of test scheme based on bandpass filtering can be performed for all of the engine signals as shown in FIG. 4. The approach shown in FIG. 4 uses bandpass filters fixed at one center frequency to perform a pass/fail type of test to detect the presence of the defects listed for each sensor. Since several different defects produce the one quarter firing frequency component, this method is limited in its ability to identify engine defects. As explained previously, a specific combination of more than one sensor and multiple frequency components are needed in order to perform defect identification. However, cylinder isolation capability can be added to this approach to improve the overall diagnostic capability. The universal single chip hybrid active filter is a widely recognized electronic component that can provide inexpensive and reliable bandpass filters. A thick-film hybrid universal active filter manufactured by Datel (Model FLT-U2) is an example. This device uses the state variable active filter principle to implement two-pole low-pass, bandpass, and highpass filters. This device contains four operational amplifiers in a single chip. Three of the operational amplifiers are used to design the bandpass filters, and the fourth uncommitted operational amplifier is used as a gain stage for the output indication circuit. These devices along with an output indicator such as a light emitting diode are all that is needed to perform the simple and low cost method of implementing frequency domain signal analysis techniques for engine defect detection.

Electronic signals corresponding to changes in exhaust system pressure, intake manifold vacuum, engine oil pressure, and crankcase pressure can be provided by conventional strain gauge type pressure transducers (e.g. Bell and Howell Cec Model 3-426-0001). Other types of pressure transducers can be used for this application (e.g. piezoelectric, diffused semiconductor, variable reluctance, etc.), provided they have adequate frequency response (greater than 1000 Hz). Location of the pressure transducer affects the overall signal characteristics, and a minimum amount of backpressure must exit in the exhaust system to properly perform exhaust pressure diagnostics (greater than or equal to 0.5 Hg at 2000 RPM/no load). An analog signal corresponding to instantaneous changes in engine speed can be provided by any common conventional method (e.g. magnetic pick-up sensing engine flywheel teeth coupled to a frequency-to-voltage converter electronic circuit).

Various modifications and variations will no doubt occur to those skilled in the various arts to which this invention pertains. For example, a particular sequence of processing sensor outputs may be varied from that disclosed herein. These and all variations which basically rely on the teachings through which this disclosure has advanced the art are properly considered within the scope of this invention.

APPENDIX

The following table contains difference frequency spectrums for over 25 types of Ford 2.3 liter 4 cylinder engine defects. These spectrums were established by comparing baseline spectrums for a "normal" engine with no defects operated at 1000 RPM±20 RPM without external engine load to frequency spectrums repeated with the listed implanted defects. The signal amplitude difference between the two spectrums is the information shown in the Table. The results are listed as a signal amplitude ratio (SAR) and the corresponding frequency component shown as the frequency coefficient (FC) using the following format $$SAR_1@FC_1, SAR_2@FC_2, SAR_3@FC_3, \text{etc.}$$

Signal amplitude ratio is listed at each frequency where the difference between the "normal" and "defect" spectrums was significant (greater than 20%). Data was taken for all sensors for each defect. Sensors not listed imply that the spectrum for the particular defect was not significantly different than the "normal" spectrum.

Signal amplitude ratio (SAR) and frequency coefficient are defined by the following equations:

$$\text{SIGNAL AMPLITUDE RATIO } (SAR) = \frac{\text{DEFECT AMPLITUDE (mv)}}{\text{NORMAL AMPLITUDE (mv)}}$$

$$\text{FREQUENCY COEFFICIENT } (FC) = \frac{\text{DEFECT FREQUENCY (Hz)}}{\text{ENGINE FIRING FREQUENCY (Hz)}}$$

WHERE: DEFECT FREQUENCY = frequency at which difference between normal vs. defect spectrums occur as defined previously $$\text{ENGINE FIRING FREQUENCY} = \frac{RPM}{60} \times \frac{N}{2}$$

and in this case $$\text{ENGINE FIRING FREQUENCY} = \frac{1000 \text{ RPM}}{60} \times \frac{4}{2}$$
$$= 33.33 \text{ Hz}$$

| 2.3L ENGINE DEFECT | SENSOR | DIFFERENCE SPECTRUM (SAR @ FC) |
|---|---|---|
| ENGINE MISFIRE<br>Shorted Plug Wire<br>Open Plug Wire<br>Excessively Lean<br>A/F Ratio<br>Large Intake<br>Manifold Leaks<br>Defective<br>Distributor | Exhaust<br>Pressure<br><br>Engine<br>Speed<br>Intake<br>Manifold<br>Vacuum | 60 @ 0.25, 20 @ 0.50,<br>5 @ 0.75, 4 @ 1.25, 2 @ 1.75,<br>2 @ 2.0, 2 @ 2.25<br>18 @ 0.25, 8.5 @ 0.50,<br>4.5 @ 0.75, 2 @ 1.25<br>7 @ 0.25, 2.5 @ 0.50, 8 @ 0.75,<br>5 @ 1.25, 2 @ 1.75 |
| INTAKE MANIFOLD<br>LEAKS<br>1.0 CFM < Leak < 2.0 CFM | Exhaust<br>Pressure | 4 @ 0.0625, 4 @ 0.125,<br>8 @ 0.1875, 10 @ 0.25,<br>4 @ 0.3125, 4 @ 0.375,<br>4 @ 0.4375, 4 @ 0.5625,<br>4 @ 0.625, 4 @ 0.6875,<br>4 @ 0.75, 3 @ 0.8125,<br>2 @ 0.875, 2 @ 0.9375 |
| COLLAPSED EXHAUST<br>VALVE TAPPET | Exhaust<br>Pressure<br>Engine<br>Speed<br>Intake<br>Vacuum<br>Oil<br>Pressure | 10 @ 0.25, 8 @ 0.75<br><br>2 @ 0.035, 3 @ 0.25,<br>2 @ 0.50, 2 @ 0.75<br>20 @ 0.25, 10 @ 0.50,<br>5 @ 0.75<br>5 @ 0.375, 2.5 @ 0.50,<br>2 @ 1.75, 0.5 @ 2.0 |
| COLLAPSED INTAKE<br>VALVE TAPPETS | Exhaust<br>Pressure<br>Engine<br>Speed<br>Intake<br>Vacuum<br>Oil<br>Pressure | 2 @ 0.25, 2 @ 0.75,<br>0.6 @ 1.0<br>2 @ 0.0625, 2.5 @ 0.125,<br>3 @ 0.25, 1.5 @ 0.75<br>2.5 @ 0.25, 3 @ 0.50,<br>3 @ 0.75<br>2.5 @ 0.25, 0.5 @ 1.0,<br>5 @ 1.75, 0.5 @ 2.0,<br>2 @ 2.25 |
| EGR VALVE LEAKS<br>>1/16" DIA. HOLE | Exhaust<br>Pressure<br>Engine<br>Speed<br>Intake<br>Vacuum | 6 @ 0.25, 2 @ 0.50<br>2 @ 0.75<br>2 @ 0.0625, 4 @ 0.125,<br>4 @ 0.1875, 2 @ 0.25<br>4 @ 0.25, 2 @ 0.75 |
| IMPROPER CAMSHAFT<br>TIMING<br>One Tooth Clockwise | Intake<br>Vacuum<br>Oil<br>Pressure | 10 @ 2.0<br><br>10 @ 0.75, 5 @ 1.95 |
| IMPROPER CAMSHAFT<br>TIMING<br>One Tooth Counter-<br>Clockwise | Engine<br>Speed<br>Intake<br>Vacuum<br>Oil<br>Pressure | 5 @ 0.360<br><br>5 @ 0.0625<br><br>10 @ 0.75 |
| IMPROPER CAMSHAFT<br>TIMING<br>Two Teeth<br>Clockwise | Exhaust<br>Pressure<br>Engine<br>Speed<br>Intake<br>Vacuum<br>Oil<br>Pressure | 6 @ 0.360, 5 @ 0.75<br><br>5 @ 0.125, 5 @ 0.360,<br>5 @ 0.50<br>5 @ 0.078<br><br>5 @ 0.638, 5 @ 2.04 |
| IMPROPER CAMSHAFT<br>TIMING<br>Two Teeth Counter-<br>Clockwise | Exhaust<br>Pressure<br>Engine<br>Speed<br>Intake<br>Vacuum<br>Oil<br>Pressure | 5 @ 0.201, 5 @ 0.402,<br>5 @ 0.603, 5 @ 0.804<br>5 @ 0.377, 2 @ 0.75<br><br>5 @ 0.089, 2 @ 0.801,<br>3 @ 0.890<br>2 @ 0.383, 5 @ 0.801 |
| MISSING MAIN<br>BEARINGS | Oil<br>Pressure | 6 @ 0.045, 2 @ 0.090,<br>0.10 @ 0.50, 010 @ 1.0 |
| TOP COMPRESSION<br>PISTON RING MISSING | Engine<br>Speed | 5 @ 0.25 |
| INCORRECT SPARK<br>TIMING<br>>10° RETARDED | Exhaust<br>Pressure | 5 @ 2.10, 2.5 @ 3.0 |
| SCORED INTAKE<br>VALVE<br>>6.0 SCFH @<br>40" H$_2$O | Exhaust<br>Pressure<br><br><br>Engine<br>Speed<br>Intake<br>Vacuum | 4 @ 0.083, 4 @ 0.1662,<br>4 @ 0.25, 4 @ 0.332,<br>4 @ 0.415, 5 @ 0.50,<br>2 @ 0.664, 2 @ 0.75<br>5 @ 0.25, 5 @ 0.50,<br>5 @ 0.75<br>10 @ 0.50 |

-continued

| 2.3L ENGINE DEFECT | SENSOR | DIFFERENCE SPECTRUM (SAR @ FC) |
|---|---|---|
| | Crankcase Pressure | 10 @ 0.75 |
| SCORED EXHAUST VALVE >9.0 SCFH @ 40" H$_2$O | Exhaust Pressure | 10 @ 3.57 |
| | Intake Vacuum | 10 @ 0.50 |
| HOLE IN PISTON DOME >1/16" DIA. | Exhaust Pressure | 2.5 @ 0.50 |
| | Intake Vacuum | 5 @ 0.50 |
| | Crankcase Pressure | 10 @ 0.25, 5 @ 0.50 |
| TWO TOP COMPRESSION RINGS MISSING | Exhaust Pressure | 10 @ 0.25, 6 @ 0.50, 5 @ 0.75, 2 @ 1.25, 2 @ 1.5, 2 @ 1.75 |
| | Engine Speed | 6 @ 0.25, 4 @ 0.50, 2 @ 0.75 |
| | Intake Vacuum | 3 @ 0.0432, 2 @ 0.0864, 4 @ 0.25, 2 @ 0.50, 2 @ 0.75 |
| | Crankcase Pressure | 15 @ 0.25, 10 @ 0.50, 5 @ 0.75 |
| WEAK INTAKE VALVE SPRINGS Heated to Remove Temper | Exhaust Pressure | 15 @ 0.25, 8 @ 0.50, 15 @ 0.75, 4 @ 1.25, 4 @ 1.5, 2 @ 1.75 |
| | Engine Speed | 5 @ 0.29, 4 @ 0.50, 2 @ 0.75 |
| | Intake Vacuum | 5 @ 0.0432, 10 @ 0.25, 15 @ 0.50, 5 @ 0.75 |
| WEAK EXHAUST VALVE SPRINGS | Exhaust Pressure | 5 @ 0.25, 15 @ 0.50, 8 @ 0.75 |
| | Engine Speed | 10 @ 0.25, 5 @ 0.50, 5 @ 0.75 |
| | Intake Vacuum | 15 @ 0.25, 10 @ 0.50, 5 @ 0.75 |
| CYLINDER HEAD GASKET LEAK | Exhaust Pressure | 15 @ 0.25, 10 @ 0.75, 8 @ 0.75, 10 @ 1.25, 8 @ 1.75 |
| .0625" PIECE MISSING BETWEEN CYL #1 & #2 | Engine Speed | 15 @ 0.25, 4 @ 0.50, 12 @ 0.75 |
| | Intake Vacuum | 15 @ 0.25, 10 @ 0.50, 5 @ 0.75, 10 @ 1.25 |
| | Crankcase Pressure | 4 @ 0.25, 12 @ 0.75, 10 @ 1.35 |
| MISSING CONNECTING ROD BEARING | Oil Pressure | 10 @ 0.25, 0.5 @ 1.0 |

STATEMENT OF INDUSTRIAL APPLICABILITY

A signal analyzer in accordance with an embodiment of this invention can detect the existence of engine defects and determine the type of engine defect. Use of such a signal analyzer as part of an engine fabrication process can aid in quality control and control of the manufacturing process.

We claim:

1. A signal analyzer for detecting engine defects including:
    an engine speed sensor means for detecting engine speed and generating an electrical engine speed signal;
    an exhaust pressure sensor means for detecting engine exhaust pressure and generating an electrical exhaust pressure signal;
    an intake manifold vacuum sensor means for detecting engine intake manifold vacuum and generating an electrical intake manifold vacuum signal;
    a crankcase pressure sensor means for detecting blowby gas pressure in the engine crankcase and generating an electrical crankcase pressure signal;
    an oil pressure sensor means for detecting engine oil pressure and generating an electrical oil pressure signal;
    a frequency domain analyzer circuit means coupled to said engine speed sensor means exhaust pressure sensor means, intake manifold vacuum sensor means, crankcase pressure sensor means and oil pressure sensor means for generating a frequency domain spectrum signal from the outputs of said coupled sensor means; and
    a comparison means coupled to said frequency domain analyzer circuit means for comparing said frequency domain spectrum signal to a normal engine signal thereby determining at what frequencies differences between the two signals exist, such differences being indicative of engine defects.

2. A signal analyzer as recited in claim 1 further comprising a frequency classifier means for associating an engine defect with any variations in said frequency domain spectrum signal from said normal engine signal.

3. A signal analyzer for detecting engine defects including:
    a plurality of sensing means coupled to the engine for detecting at least two engine operating parameters from the following group: engine speed, engine exhaust manifold pressure, intake manifold vacuum, crankcase gas pressure, and oil pressure;

a frequency domain analyzer circuit means coupled to receive said at least two engine operating parameters for generating a frequency domain spectrum signal as a function of said at least two engine operating parameters; and a comparison means coupled to said frequency domain analyzer circuit means for comparing said frequency domain spectrum signal to a normal engine signal thereby determining at what frequencies differences between the two signals exist, such differences being indicative of particular types of engine defect depending upon the pattern of such differences.

4. A signal analyzer as recited in claim 3 wherein said frequency domain analyzer circuit includes:

a buffer means coupled to said sensing means for filtering undesired noise;

a channel selection switch means coupled to said buffer means for selecting one of a plurality of outputs associated with one of said sensing means, said channel selection switch having one output; and a selectable bandpass filter means coupled to said channel selection switch for processing information associated with one of said sensing means.

5. A signal analyzer as recited in claim 4 wherein said comparison means includes stored information for comparison with the output of said selectable bandpass filter means.

6. A signal analyzer as recited in claim 5 further comprising:

an ignition sensor means for sensing engine ignition pulses and the firing of a particular engine cylinder;

an engine event generator means coupled to said ignition sensing means for generating signals indicative of the firing of each one of the engine cylinders; and a cylinder isolator means coupled to said engine event generator means and to said frequency domain analyzer circuit means for providing an indication of the engine cylinder associated with a particular fault.

7. A signal analyzer as recited in claim 5 wherein:

said plurality of sensing means detects the engine parameters of engine exhaust manifold pressure, engine speed, and intake manifold vacuum;

said frequency domain analyzer circuit means passes frequencies of the engine firing frequency multiplied by the factors of 0.25, 0.50, 0.75, 1.25, 1.75, 2.0 and 2.25 and said comparison means including means for classifying the defect as an engine misfire upon detection of predetermined signal amplitudes at the frequencies passed by said frequency domain analyzer circuit means.

8. A signal analyzer as recited in claim 5 wherein:

said plurality of sensing means detects the engine parameters of engine exhaust manifold pressure;

said frequency domain analyzer circuit means passes the frequencies of the engine firing frequency multiplied by the factors of 0.0625, 0.125, 0.1875, 0.25, 0.3125, 0.375, 0.4375, 0.5625, 0.625, 0.6875, 0.75, 0.8125, 0.875 and 0.9375; and said comparison means including means for classifying the defect as an intake manifold leak upon detection of predetermined signal amplitudes at the frequencies passed by said frequency domain analyzer circuit means.

9. A signal analyzer as recited in claim 5 wherein:

said plurality of sensing means detects the engine parameters of engine exhaust manifold pressure, engine speed, intake manifold vacuum and oil pressure;

said frequency domain analyzer circuit means passes the frequencies of the engine firing frequency multiplied by the factors of 0.25 and 0.75 for engine exhaust manifold pressure; 0.035 0.25, 0.50 and 0.75 for engine speed; 0.25, 0.50 and 0.75 for intake manifold vacuum; and 0.375, 0.50, 1.75 and 2.0 for oil pressure; and said comparison means including means for classifying the defect as a collapsed exhaust valve tappet upon detection of predetermined signal amplitudes at the frequencies passed by said frequency domain analyzer circuit means.

10. A signal analyzer as recited in claim 5 wherein:

said plurality of sensing means detects the engine parameters of engine exhaust manifold pressure, engine speed, intake manifold vacuum, and oil pressure;

said frequency domain analyzer circuit means passes the frequencies of the engine firing frequency multiplied by the factors of 0.25, 0.75, and 1.0 for engine exhaust manifold pressure; 0.0625, 0.125, 0.25 and 0.75 for engine speed; 0.25, 0.50, and 0.75 for intake manifold vacuum and 0.25, 1.0, 1.75, 2.0 and 2.25 for oil pressure; and said comparison means including means for classifying the defect as collapsed intake valve tappets upon detection of predetermined signal amplitudes at the frequencies passed by said frequency domain analyzer circuit means.

11. A signal analyzer as recited in claim 5 wherein:

said plurality of sensing means detects the engine parameters of engine exhaust manifold pressure, engine speed, and intake manifold vacuum;

said frequency domain analyzer circuit means passes the frequencies of the engine firing frequency multiplied by the factors of 0.25, 0.50 and 0.75 for engine exhaust manifold pressure; 0.0625, 0.125, 0.1875 and 0.25 for engine speed; 0.25 and 0.75 for intake manifold vacuum; and said comparison means including means for classifying the defect as exhaust gas recirculation valve leaks upon detection of predetermined signal amplitudes at the frequencies passed by said frequency domain analyzer circuit means.

12. A signal analyzer as recited in claim 5 wherein:

said plurality of sensing means detects the engine parameters of intake manifold vacuum and oil pressure;

said frequency domain analyzer circuit means passes the frequencies of the engine firing frequency multiplied by the factors of 2 for intake manifold vacuum; and 0.75 and 1.95 for oil pressure; and said comparison means including means for classifying the defect as improper camshaft timing upon detection of predetermined signal amplitudes at the frequencies passed by said frequency domain analyzer circuit means.

13. A signal analyzer as recited in claim 5 wherein:

said plurality of sensing means detects the engine parameters of engine speed, intake manifold vacuum and oil pressure;

said frequency domain analyzer circuit means passes the frequencies of the engine firing frequency multiplied by the factors of 0.360 for engine speed; 0.0625 for intake manifold vacuum; and 0.75 for oil pressure; and said comparison means including means for classifying the defect as improper camshaft timing upon detection of predetermined signal amplitudes at the frequencies passed by said frequency domain analyzer circuit means.

14. A signal analyzer as recited in claim 5 wherein:

said plurality of sensing means detects the engine parameters of engine exhaust manifold pressure, engine speed, intake manifold vacuum and oil pressure;

said frequency domain analyzer circuit means passes the frequencies of the engine firing frequency multiplied by the factors of 0.360 and 0.75 for engine exhaust manifold pressure; 0.125, 0.360 and 0.50 for engine speed; 0.078 for intake manifold vacuum and 0.638 and 2.04 for oil pressure; and said comparison means including means for classifying the defect as improper camshaft timing upon detection of predetermined signal amplitudes at the frequencies passed by said frequency domain analyzer circuit means.

15. A signal analyzer as recited in claim 5 wherein:

said plurality of sensing means detects the engine parameters of engine exhaust manifold pressure, engine speed, intake manifold vacuum, and oil pressure;

said frequency domain analyzer circuit means passes the frequencies of the engine firing frequency multiplied by the factors of 0.201, 0.402, 0.603 and 0.804 for engine exhaust manifold pressure; 0.377 and 0.75 for engine speed; 0.089, 0.801, 0.890 for intake manifold vacuum; 0.383 and 0.801 for oil pressure; and said comparison means including means for classifying the defect as improper camshaft timing upon detection of predetermined signal amplitudes at the frequencies passed by said frequency domain analyzer circuit means.

16. A signal analyzer as recited in claim 5 wherein:

said plurality of sensing means detects the engine parameters of oil pressure;

said frequency domain analyzer circuit means passes the frequencies of the engine firing frequency multiplied by the factors of 0.045, 0.090, 0.50 and 1.0; and said comparison means including means for classifying the defect as missing main bearings upon detection of predetermined signal amplitudes at the frequencies passed by said frequency domain analyzer circuit means.

17. A signal analyzer as recited in claim 5 wherein:

said plurality of sensing means detects the engine parameters of engine speed;

said frequency domain analyzer circuit means passes the frequencies of the engine firing frequency multiplied by the factors of 0.25; and said comparison means including means for classifying the defect as top compression piston ring missing upon detection of predetermined signal amplitudes at the frequencies passed by said frequency domain analyzer circuit means.

18. A signal analyzer as recited in claim 5 wherein:

said plurality of sensing means detects the engine parameters of engine exhaust manifold pressure;

said frequency domain analyzer circuit means passes the frequencies of the engine firing frequency multiplied by the factors of 2.10 and 3.0; and said comparison means including means for classifying the defect as incorrect spark timing upon detection of predetermined signal amplitudes at the frequencies passed by said frequency domain analyzer circuit means.

19. A signal analyzer as recited in claim 5 wherein:

said plurality of sensing means detects the engine parameters of engine exhaust manifold pressure, engine speed, intake manifold vacuum and crankcase pressure;

said frequency domain analyzer circuit means passes the frequencies of the engine firing frequency multiplied by the factors of 0.083, 0.1662, 0.25 0.332, 0.415, 0.50, 0.664, and 0.75 for engine exhaust manifold pressure; 0.25, 0.50, and 0.75 for engine speed; 0.50 for intake manifold vacuum and 0.75 for crankcase pressure; and said comparison means including means for classifying the defect as a scored intake valve upon detection of predetermined signal amplitudes at the frequencies passed by said frequency domain analyzer circuit means.

20. A signal analyzer as recited in claim 5 wherein:

said plurality of sensing means detects the engine parameters of engine exhaust manifold pressure and intake manifold vacuum;

said frequency domain analyzer circuit means passes the frequencies of the engine firing frequency multiplied by the factors of 3.57 for engine exhaust manifold pressure and 0.50 for intake manifold vacuum; and said comparison means including means for classifying the defect as a scored exhaust valve upon detection of predetermined signal amplitudes at the frequencies passed by said frequency domain analyzer circuit means.

21. A signal analyzer as recited in claim 5 wherein:

said plurality of sensing means detects the engine parameters of engine exhaust manifold pressure, intake manifold vacuum and crankcase pressure;

said frequency domain analyzer circuit means passes the frequencies of the engine firing frequency multiplied by the factors of 0.50 for engine exhaust manifold pressure, 0.50 for intake manifold vacuum and 0.25 and 0.50 for crankcase pressure; and said comparison means including means for classifying the defect as hole in piston dome upon detection of predetermined signal amplitudes at the frequencies passed by said frequency domain analyzer circuit means.

22. A signal analyzer as recited in claim 5 wherein:

said plurality of sensing means detects the engine parameters of engine exhaust manifold pressure, engine speed, intake manifold vacuum and crankcase pressure;

said frequency domain analyzer circuit means passes the frequencies of the engine firing frequency multiplied by the factors of 0.25, 0.50, 0.75, 1.25 1.5, and 1.75 for engine exhaust manifold pressure; 0.25, 0.50 and 0.75 for engine speed; 0.0432, 0.0864, 0.25, 0.50 and 0.75 for intake manifold vacuum and 0.25, 0.50 and 0.75 for crankcase pressure; and said comparison means including means for classifying the defect as two top compression rings missing upon detection of predetermined signal amplitudes at the frequencies passed by said frequency domain analyzer circuit means.

23. A signal analyzer as recited in claim 5 wherein:

said plurality of sensing means detects the engine parameters of engine exhaust manifold pressure, engine speed and intake manifold vacuum;

said frequency domain analyzer circuit means passes the frequencies of the engine firing frequency multiplied by the factors of 0.25, 0.50, 0.75, 1.25, 1.5 and 1.75 for exhaust pressure; 0.29, 0.50 and 0.75 for engine speed; 0.0432, 0.25, 0.50 and 0.75 for intake manifold vacuum; and said comparison means including means for classifying the defect as weak intake valve springs upon detection of predetermined signal amplitudes at the frequencies passed by said frequency domain analyzer circuit means.

24. A signal analyzer as recited in claim 5 wherein:

said plurality of sensing means detects the engine parameters of engine exhaust manifold pressure, engine speed and intake manifold vacuum;

said frequency domain analyzer circuit means passes the frequencies of the engine firing frequency multiplied by the factors of 0.25, 0.50 and 0.75 for engine exhaust manifold pressure, 0.25, 0.50 and 0.75 for engine speed; 0.25, 0.50 and 0.75 for intake manifold vacuum and said comparison means including means for classifying the defect as weak exhaust valve springs upon detection of predetermined signal amplitudes at the frequencies passed by said frequency domain analyzer circuit means.

25. A signal analyzer as recited in claim 5 wherein:

said plurality of sensing means detects the engine parameters of engine exhaust manifold pressure, engine speed, intake manifold vacuum and crankcase pressure;

said frequency domain analyzer circuit means passes the frequencies of the engine firing frequency multiplied by the factors of 0.25, 0.50, 0.75, 1.25 and 1.75 for engine exhaust manifold pressure, 0.25, 0.50 and 0.75 for engine speed; 0.25, 0.50, 0.75 and 1.25 for intake manifold vacuum and 0.25, 0.75 and 1.35 for crankcase pressure; and said comparison means including means for classifying the defect as a cylinder head gasket leak upon detection of predetermined signal amplitudes at the frequencies passed by said frequency domain analyzer circuit means.

26. A signal analyzer as recited in claim 5 wherein:

said plurality of sensing means detects the engine parameters of oil pressure;

said frequency domain analyzer circuit means passes the frequencies of the engine firing frequency multiplied by the factors of 0.25 and 1.0; and said comparison means including means for classifying the defect as a missing connecting rod bearing upon detection of predetermined signal amplitudes at the frequencies passed by said frequency domain analyzer circuit means.

27. A signal analyzer for detecting defects in a multi-cylinder engine including:

a plurality of sensing means coupled to the engine for detecting engine operating parameters including engine exhaust manifold pressure, intake manifold vacuum, crankcase gas pressure and oil pressure; and a bandpass filter associated with at least one of said sensing means for passing a band of frequencies including the frequency of cylinder firings.

28. A signal analyzer as recited in claim 27 further comprising:

a plurality of bandpass filters, one coupled with each of said sensing means; and a classification means associated with each of said bandpass filters for associating particular engine defects with the outputs of said bandpass filters.

29. A signal analyzer as recited in claim 27 wherein the engine has four cylinders and at least one of said bandpass filters passes a band of frequencies centered at 8.3 Hz.

* * * * *